United States Patent [19]

Kandachi et al.

[11] 4,361,431

[45] Nov. 30, 1982

[54] METHOD OF FORMING THIN SHEET GLASS BY FLOAT PROCESS

[75] Inventors: Takayoshi Kandachi; Keizi Sueda; Minoru Suzuki, all of Matsusaka, Japan

[73] Assignee: Central Glass Company, Limited, Ube, Japan

[21] Appl. No.: 314,401

[22] Filed: Oct. 23, 1981

[30] Foreign Application Priority Data

Oct. 27, 1980 [JP] Japan .............................. 55-150921
May 14, 1981 [JP] Japan .............................. 56-72424
May 20, 1981 [JP] Japan .............................. 56-76085

[51] Int. Cl.$^3$ .............................................. C03B 18/02
[52] U.S. Cl. ...................................... 65/99.5; 65/182.4
[58] Field of Search .............................. 65/99.5, 182.4

[56] References Cited

U.S. PATENT DOCUMENTS

| | | | |
|---|---|---|---|
| 3,432,284 | 3/1969 | Galotta | 65/99.5 |
| 3,843,344 | 10/1974 | Galey | 65/182.4 X |
| 3,843,346 | 10/1974 | Edge et al. | 65/182.4 X |
| 3,961,930 | 6/1976 | Robinson et al. | 65/99.5 |

*Primary Examiner*—Robert L. Lindsay, Jr.
*Attorney, Agent, or Firm*—Fleit & Jacobson

[57] ABSTRACT

In a method of forming a thin sheet glass by the float process, a thin layer of molten glass is formed by making molten glass flow through a sluice formed on the surface of a molten metal bath, and the glass layer is drawn lengthways of the bath to further reduce its thickness and advance while its upper surface is exposed to a cooled atmosphere. The sluice is a vertically narrow gap between the surface of the molten metal and a lower end face of a wall extending above and transversely of the molten metal bath. By shaping a lower end portion of this wall and avoiding particularly heating the molten glass in the vicinity of the sluice, it has become possible to obtain defectless sheet glass thinner than one millimeter.

18 Claims, 17 Drawing Figures

METHOD OF FORMING THIN SHEET GLASS BY FLOAT PROCESS

BACKGROUND OF THE INVENTION

This invention relates to an improved method of forming sheet glass by the float process wherein molten glass is delivered onto the surface of molten metal in a bath and is formed into a continuous sheet or ribbon while the glass is floating and advancing on the molten metal, which method is particularly suited to the production of a sheet glass thinner than about one millimeter.

In the well known float process, molten glass is caused to spread on the surface of a molten metal such as tin to form a layer of glass which is gradually cooled while it is floating on the molten metal until it becomes a dimensionally stable, flat sheet or ribbon of glass. Under equilibrium conditions, the molten glass layer floating on the molten metal will assume an equilibrium thickness of about 6 to 7 mm.

To produce a sheet glass thinner than equilibrium thickness by the float process, it is usual to stretch an unsolidified region of the glass ribbon on the molten metal along the direction of travel of the glass ribbon by applying a pulling or tractive force to the cooled and solidified region of the glass ribbon from the outside of the outlet end of the molten metal bath. In this case it is natural that a sideward constrictive force acts on the glass ribbon, and it is usual to oppose to the constrictive force by means of top or side rolls that are arranged along and above the molten metal bath so as to engage lateral marginal regions of the glass ribbon. Therefore, the marginal regions of the glass ribbon at this stage need to be thick enough to surely engage the side rolls, but it becomes difficult to meet this requirement if the thickness of the glass ribbon in its flat, major region is reduced unlimitedly. For this reason, it is very difficult to industrially produce a sheet glass thinner than about 2 mm by this technique.

As an improved method of producing sheet glass by the float process, Japanese Patent Application Publication No. 54(1979)-31012 proposes to control the flow of molten glass delivered onto the molten metal bath by forming a sort of sluice at a short distance from the inlet end of the molten metal bath and heating the molten glass while it advances through this sluice. More particularly, the sluice is provided by an elongate solid block of a heat-resistant and electrically conducting material, which is fixedly disposed slightly above the surface of the molten metal to extend transversely of the advancing flow of the molten glass such that the molten glass on the molten metal in a region between the inlet end of the molten metal bath and the elongate solid block forms a pool and is forced to pass through the gap between the bottom face of the solid body and the surface of the molten metal to advance to the downstream. The heating of the molten glass is effected by making an electric current flow through the molten glass between the sluice-forming solid block and the molten metal to generate Joule's heat. Also in this method, a tractive force is imposed on the glass layer on the downstream side of the sluice-forming solid block. In fact, it is possible to produce sheet glass of very small thickness by this method.

However, we have recognized that when sheet glass thinner than about 1 mm is produced by the method of the above referred Japanese patent specification the obtained sheet glass exhibits distortion in the form from a number of continuous lines along the direction of the travel of glass on the molten metal bath and/or contains a number of small bubbles in the glass body. In our view, it is quite difficult to obtain sheet glass of commercially satisfactory quality by this method when the thickness of the sheet glass is smaller than about 1 mm. Besides, the electric heating of the molten glass at or in the vicinity of the sluice offers various problems to the glass forming operation and becomes a cause of lowering of productivity.

SUMMARY OF THE INVENTION

It is an object of the present invention to provide an improved method of forming sheet glass by the float process, which method enables to obtain flat sheet glass of a relatively small thickness with uniformly good quality even when the thickness is smaller than about 1 mm.

A method according to the invention is of the type forming a relatively thin sheet of glass in a glass forming chamber which includes a molten metal bath constituted of a bottom structure, two opposite side walls, a molten glass inlet structure at one end and a sheet glass outlet structure at the other end and a roof structure defining an interior space above the molten metal bath fundamentally by the steps of feeding molten glass onto the surface of the molten metal, in the bath, causing the molten glass to spread on the surface of the molten metal to form a thin layer of the molten glass, stretching the molten glass layer in a direction substantially parallel to the side walls so as to reduce the thickness of the molten glass layer and advance this layer towards the outlet structure, and cooling the thinned molten glass layer. The improvement according to the invention resides essentially in that a sluice-forming wall is provided in the aforementioned interior space at a distance downstream from the molten glass inlet structure so as to extend widthways of the molten metal bath and leave a vertically narrow gap between a lower end of the sluice-forming wall and the surface of the molten metal in the bath thereby producing a pool of the molten glass on the molten metal in a region between the inlet structure and the sluice-forming wall and that the aforementioned layer of the molten glass is formed by causing the molten glass to flow out of the pool through the vertically narrow gap between the sluice-forming wall and the molten metal. The front side of the sluice-forming wall facing the molten glass pool should be formed with a slant surface contiguous to the lower end of this wall such that the surface of the molten glass in the pool intersects this slant surface and that the vertical distance of the slant surface from the surface of the molten metal decreases as the horizontal distance of the slant surface from the aforementioned inlet structure increases, and the rear side of the sluice-forming wall should be formed with a vertical surface contiguous to the lower end of this wall.

The slant surface formed on the front side of the sluice-forming wall allows the molten glass to smoothly enter the gap between this wall and the surface of the molten metal without stagnating on the front side of this wall and encounter an increasing resistance of this wall as it flows towards the downstream. As the effect of the vertical surface of the sluice-forming wall on its rear side, the direction of an inevitable attraction force attributed to the affinity of the molten glass to the sluice-forming wall becomes perpendicular to the direction of the stretching and tractive force acting on the molten glass layer, so that the advance of the molten glass is not irregularly disturbed even though the attraction force is not uniform over the entire length of the sluice-forming wall extending widthways of the molten glass layer. Accordingly the molten glass can be formed into a thin layer and further stretched without losing uniformity of its viscosity. Therefore, sheet glass formed by this method is free from linear distortions even when the sheet glass is thinner than 1 mm.

In the method according to the invention, the shaping of the molten glass into a thin layer by using the sluice-forming wall is accomplished without particularly heating the molten glass because we have confirmed that heating of the molten glass at this stage tends to cause local reboiling of the molten glass with generation of bubbles in the molten glass, and that when the heating is effected by the flow of an electric current through the molten glass there arise additional causes of bubbling in the molten glass. Accordingly, the method of the invention gives thin sheet glass containing no bubbles.

In the present invention, it is quite favorable to divide the interior space of the glass forming chamber into an upstream space and a downstream space by providing a heat-insulating wall at a section slightly downstream from the sluice-forming wall so as to leave a narrow space between the lower end of this heat-insulating wall and the molten metal and maintain a sufficiently high temperature atmosphere only in the upstream space, while maintaining a sufficiently low temperature atmosphere in the downstream space.

To compensate a small difference in the molten glass temperature between a widthways central region and side regions of the aforementioned pool to thereby obtain thin sheet glass of very uniform thickness, it is preferred to make the lower end face of the sluice-forming wall such that the vertical width of the gap between the lower end face and the molten metal becomes minimal in a widthways central region of the molten metal bath and maximal in both side regions.

Also, it is effective for enhancing flatness of sheet glass and uniformity of its thickness to build a weir wall in the molten metal bath at a section immediately downstream of the sluice-forming wall so as to extend transversely of the bath and leave a thin layer of molten metal above the upper end face of the weir wall.

DESCRIPTION OF THE PREFERRED EMBODIMENTS

Figure 1:
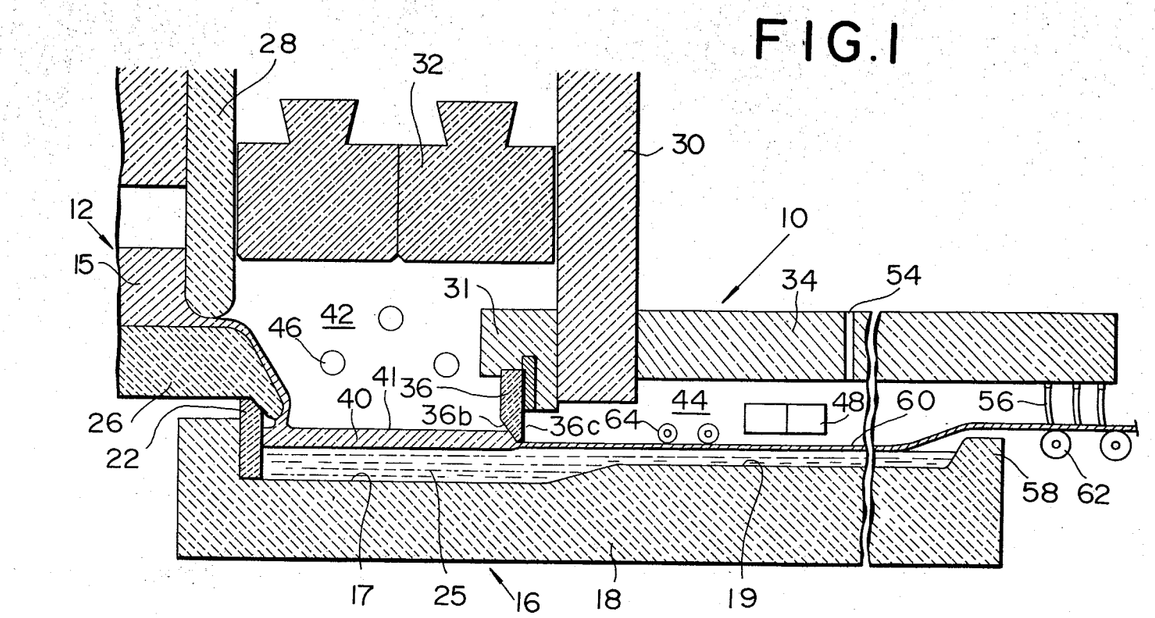
FIG. 1 is a sectional side elevation view of a glass forming apparatus used in a method according to the invention.
Figure 2:
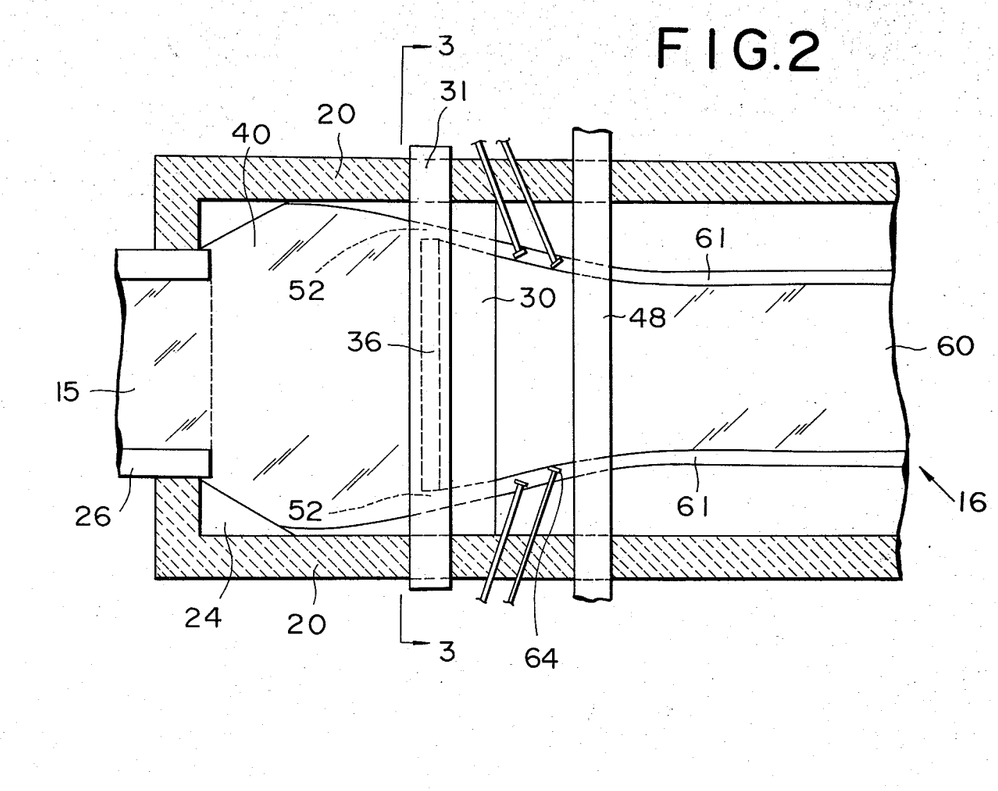
FIG. 2 is a fragmentary plan view of the apparatus of FIG. 1.
Figure 3:
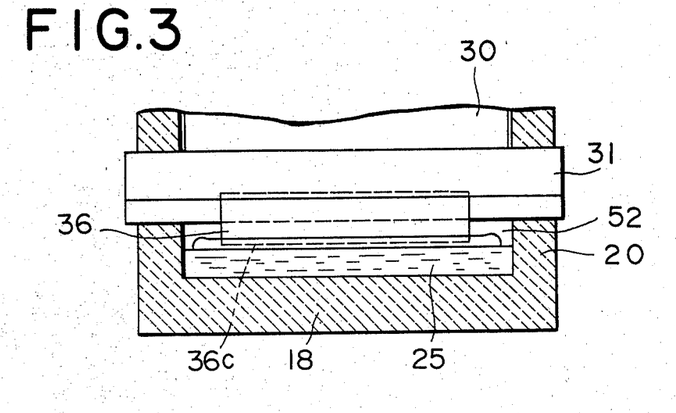
FIG. 3 is a fragmentary cross-sectional view taken along the line 3—3 in FIG. 2.

FIGS. 1 to 3 show a float process glass forming chamber 10 in which a sheet glass is formed by a method according to the invention. A canal 12 connects this glass forming chamber 10 to a glass melting and refining furnace (not shown). In this chamber 10, a refractory bottom 18, two refractory side walls 20 extending longitudinally of the chamber and a refractory wetback tile 22 located at the inlet end constitute a molten metal bath 16 filled with a molten metal 25 such as tin or its alloy. The inlet to the molten metal bath 16 is constituted of a refractory lip tile 26 and a control tweel 28 made of a refractory material in the well known manner. Indicated at 24 in FIG. 2 are graphite blocks that occupy inlet end corner regions of the molten metal bath 16. At a suitable distance from the inlet end and above the refractory bottom 18, a heat-insulating wall 30 spans the two side walls 20 such that the lower end of this wall 30 is somewhat distant from the surface of the molten metal 25. A roof structure of the chamber 10 in a region between the inlet end and the heat-insulating wall 30 takes the form of flat arch 32 that provides a relatively high ceiling, whereas a roof 34 in a region downstream of the wall 30 provides a relatively low ceiling.

Adjacent to and upstream of the heat-insulating wall 30 there is an auxiliary heat-insulating wall 31 which spans the two side walls 20 but leaves a considerably large gap between its lower end and the surface of the molten metal 25, and a sluice-forming block 36 in the form of a vertical wall (hereinafter this block 36 will be called sluice wall) is fixed to the auxiliary heat-insulating wall 31. The sluice wall 36 extends transversely of the molten metal bath 16 but terminates at some distances from the two side walls 20 as can be seen in FIG. 2. There is only a very short vertical distance between the lower end of the sluice wall 6 and the surface of the molten metal 25. Therefore, when molten glass 15 is introduced into the molten metal bath 16 as a downward stream along the surface of the lip tile 26 at a suitable flow rate determined by the vertical position of the control tweel 28, there is formed a pool 40 of molten glass on the molten metal 25 by the side walls 20, wetback tile 22 and the sluice wall 36, though the molten glass can gradually and continuously flow out of the pool 40 through the gap between the sluice wall 36 and the molten metal 25 and lateral gaps 52 between the sluice wall 36 and the side walls 20.

Thus, the heat-insulating wall 30 and the sluice wall 36 divide the interior space of the glass forming chamber 10 into an upstream space 42 and a downstream space 44. In the upstream space 42, there are heater elements 46 located sufficiently above the molten glass pool 40 for the purpose of heating the gas atmosphere in this space 42 thereby preventing undesirable lowering of the temperature of the molten glass 40 by natural radiation of heat. In the downstream space 44 there is a cooler 48 to cool the gas atmosphere in this space 44. To maintain a non-oxidizing gas atmosphere in the glass forming chamber 10 to thereby prevent oxidation of the molten metal 25, a mixed gas of nitrogen and hydrogen is continuously introduced into the downstream space 44 through gas ducts 54 provided in the roof 34. The outlet of the chamber 10 is loosely sealed by drapes 56 made of asbestos cloth for instance. Because of continuous introduction of the mixed gas, the pressure in the downstream space 44 becomes slightly above the atmospheric pressure, and a portion of the mixed gas enters the upstream space 42 through the gaps 52 between the sluice wall 36 and the side walls 20 while another portion of the mixed gas flows out of the chamber 10 through gaps between the drapes 56 and a glass ribbon 60 formed in the chamber 10 and also through gaps between the glass ribbon 60 and structural members of the molten metal bath 16.

Figure 13:
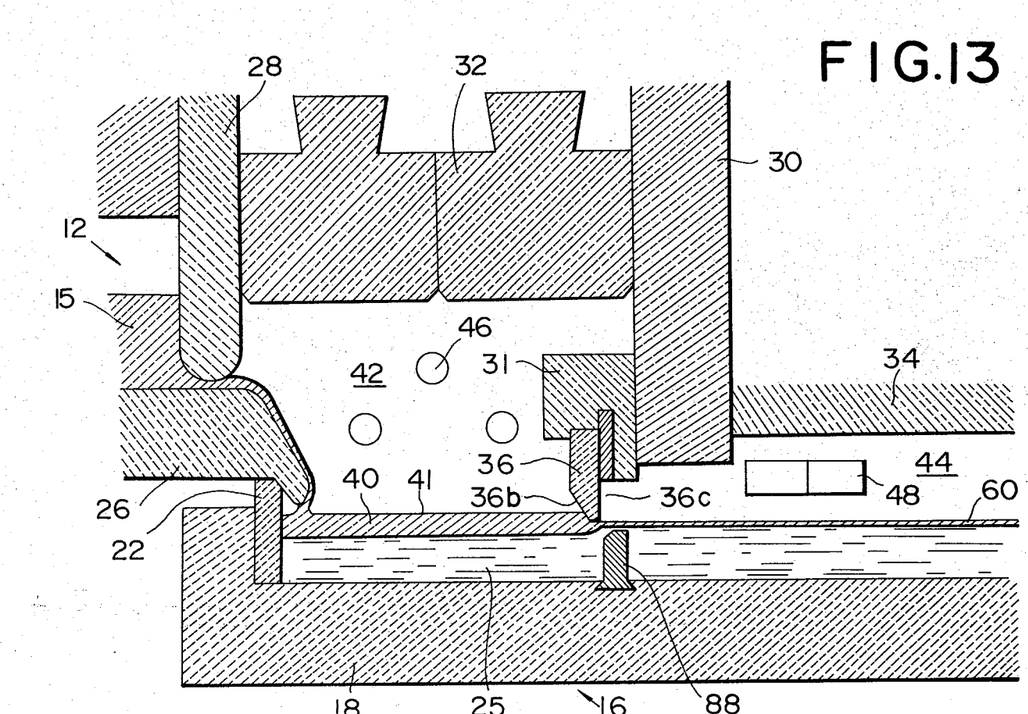
FIG. 13 is a sectional side elevation view of a principal portion of a glass forming apparatus which is a slight modification of the apparatus of FIG. 1 for use in producing a very thin sheet glass by a method of the invention.

The bottom refractory 18 has a relatively deep bottom region 17 extending from the inlet end and a relatively shallow bottom region 19 extending to the outlet end for the purpose of suppressing convection of the molten metal 25 by the effect of heat supplied from the molten glass delivered onto the molten metal bath 16. However, it is also possible to employ a molten metal bath of a uniform depth, as shown in FIG. 13, by suitably controlling the feed rate of molten glass 15 per unit time and/or by employing an alternative convection-suppressing means.

As the molten glass 15 is continuously supplied to the molten glass pool 40, the molten glass in the pool 40 gradually flows to the downstream mostly through the narrow gap between the sluice wall 36 and the surface of the molten metal 25 and partly through the lateral gaps 52 between the sluice wall 36 and the side walls 20. By passing through the narrow gap between the sluice wall 36 and the molten metal 25, the molten glass becomes a thin layer or ribbon 60 floating on the molten metal 25. A pulling or tractive force is applied to the glass ribbon 60 by the revolution of liftout rolls 62 which are arranged outside of an exit lip 58 formed at the outlet end of the molten metal bath 16 and also by the action of conveyor rolls (not shown) arranged subsequently to the liftout rolls 62. Therefore, the glass ribbon 60 is stretched and advances along the surface of the molten metal 25 towards the outlet end of the molten metal bath. While advancing in such a way, the glass ribbon 60 undergoes gradual cooling and becomes dimensionally stable before its arrival at the exit lip 58. As will be understood, the ultimate thickness of the glass ribbon 60 is not directly determined by the vertical width of the gap between the sluice wall 36 and the molten metal surface. The ultimate thickness depends on other factors such as the viscosity of the molten glass, the magnitude of the aforementioned tractive force and the advance speed of the glass ribbon 60, too.

Since a small portion of the molten glass in the pool 40 flows out through the side gaps 52 between the sluice wall 36 and the side walls 20 without passing through the narrow gap between the wall 36 and the molten metal 25, the glass ribbon 60 has side marginal regions 61 where the thickness is considerably greater than in the flat major region. Accordingly the glass forming chamber 10 may optionally be provided with top or side rolls 64 arranged so as to engage the side marginal regions 61 of the glass ribbon 60 from the upper side for the purpose of suppressing lateral constriction of the glass ribbon 60.

Figure 4:
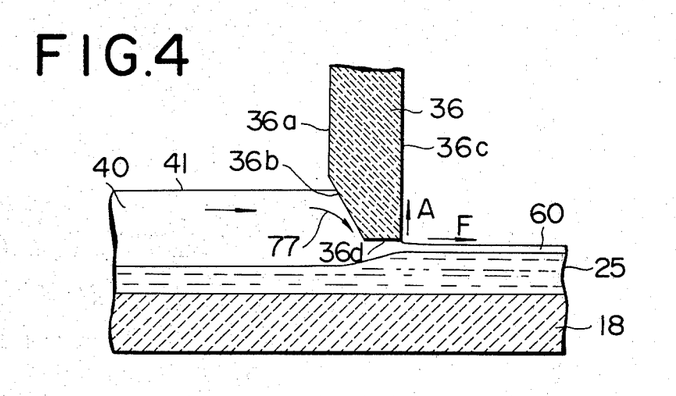
FIG. 4 is an enlargement of a sluice region in FIG. 1 for explanation of a primary feature of a method of the invention.

Referring to FIG. 4, the shape of a lower end portion of the sluice wall 36 characteristic of the present invention will be described in detail. As will be understood from the foregoing description and the illustration, only a lower end portion of the sluice wall 36 makes contact with the molten glass 40. Accordingly the shape of the remaining upper portion of this sluice wall 36 is a matter of unimportance. On the front side facing the pool 40 of molten glass, the illustrated sluice wall 36 has a vertical and flat surface 36a in its upper portion, but this is merely for the sake of convenience.

On the front side in the lower end portion, the sluice wall 36 has a slant surface 36b formed such that the surface 41 of the molten glass pool 40 always intersects this slant surface 36b, and that the vertical distance between this slant surface 36b and the surface of the molten metal 25 becomes smaller as the horizontal distance of the slant surface 36b from the inlet end of the molten metal bath 16 becomes greater. In other words, the molten glass flowing through the gap between the gap between the sluice wall 36 and the molten metal 25 encounters an increasing resistance of the sluice wall 36 as the glass advances to the downstream. On the rear side, the lower end portion of the sluice wall 36 has a vertical and flat surface 36c which terminates at the lower end of the sluice wall 36. The illustrated sluice wall 36 has a generally horizontal surface 36d as its lower end face interposing between the slant surface 36b and the vertical surface 36c, but this is not a requisite. It is permissible that the horizontal distance between the slnt surface 36b and the vertical surface 36c becomes almost zero at the lower end of the sluice wall 36.

The above described shape of the lower end portion of the sluice wall 36 has been devised based on our discovery that the appearance of linear distortions on thin sheet glass produced by the method of the above referred Japanese Patent Application Publication No. 54(1979)-31012 is attributed to the shape of the sluice-forming block or wall. Also we have confirmed that bubbles contained in the thin sheet glass produced by the prior art method are attributed to the heating of molten glass passing through the sluice. In the method according to the invention, therefore, the molten glass in the pool 40 is not particularly heated before or during its advance through the gap between the sluice wall 36 and the molten metal 25.

Figure 5:
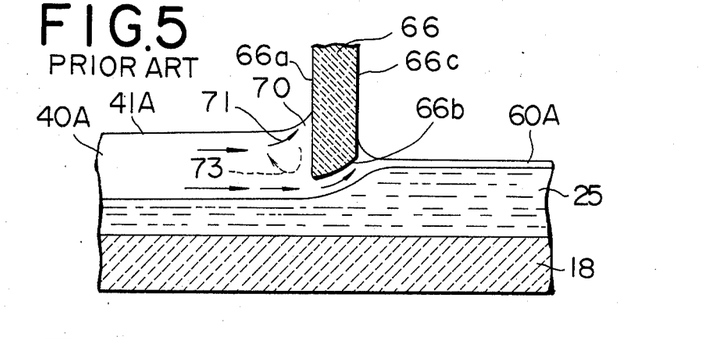
FIGS. 5 and 6 show two differently designed prior art sluice-forming blocks, respectively, in the same view as FIG. 4.
Figure 6:
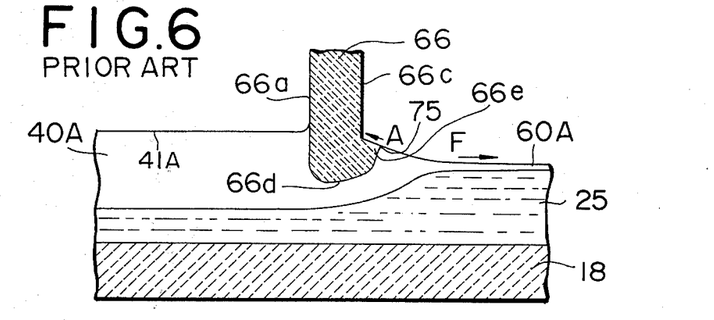

For comparison, FIGS. 5 and 6 show two kinds of shapes of a sluice wall 66 recommended in the above referred Japanese patent specification in the same sectional views as FIG. 4.

In FIG. 5, a lower end portion of the sluice wall 66 has a vertical surface 66a on the front side, and a slant (and slightly curved) surface 66b extends from the lower end of the vertical surface 66a to another vertical surface 66c on the rear side such that the vertical distance between the slant surface 66b and the surface of the molten metal 25 becomes greater as the horizontal distance of the slant surface 66b from the inlet end of the molten metal bath 16 becomes greater. In this case the surface 41A of the molten glass pool 40A intersects the front vertical surface 66a of the sluice wall 66. Therefore, a portion of the molten glass near the pool surface 41A does not smoothly flow into the gap between the wall 66 and the molten metal 25 but stagnates along the front vertical surface 66a of the wall 66 as represented by arrows 71, 73 to form a gob 70 along the intersection line between the glass surface 41A and the wall surface 66a. Due to this phenomenon, the upper portion of the molten glass stays in the pool 40A for a longer period of time than the lower portion of the molten glass, so that the molten glass passing through the gap between the sluice wall 66 and the molten metal 25 becomes nonuniform in viscosity. When a resultant glass ribbon 60A is stretched to turn into a thin sheet glass, the nonuniformity in the viscosity of the molten glass comes out as linear distortions.

In FIG. 6, the lower end of the prior art sluice wall 66 is shaped into a rounded and very gently slanting surface 66d. On the rear side this sluice wall 66 is formed with a projection 66e having a sharp edge 75 at which the rounded surface 66d terminates. Because of the rounded and gently slanting shape of the lower end face 66d, the possibility of stagnation of an upper portion of the molten glass 40 to result in the formation of a gob on the front side of the sluice wall 66 is reduced although the surface 41A of the molten glass pool 40A intersects the vertical surface 66a of the sluice wall 66 also in this case. However, a thin sheet glass produced by using this sluice wall 66 still suffers from linear distortions. There are two presumable reasons. The first reason is nonuniform stretching of the glass ribbon 60A due to the existence of the projection 66e on the sluice wall 66. In this case a reaction force to the tracting and stretching force applied to the upper and lower surfaces of the glass ribbon 60A does not uniformly distribute over the contacting surface between the molten glass and the sluice wall 66 and significantly concentrates at the sharp edge 75 of the projection 66e. The glass ribbon 60A is actually stretched immediately after separation from the sluice wall 66 at its edge 75, and particularly great stretching of the glass ribbon 60A occurs at its upper surface contiguous to the edge 75 of the sluice wall 66. Such a manner of locally intensified stretching becomes a cause of linear distortions in a surface region of the obtained sheet glass. As the second reason, an attraction force attributed to the affinity of the molten glass to the sluice wall 66 acts on the glass ribbon 60A in unfavorable directions. Because of the projection 75 of the sluice wall 66 having a slant surface defined between the sharp edge 75 and the vertical surface 66c, the attraction force represented by arrow A has a component reverse to the principal direction, represented by arrow F, of stretching of the glass ribbon 60A. Therefore, slight nonuniformity of the distribution of the attraction force over the width of the glass ribbon 60A renders the stretching force nonuniform and consequentially becomes a cause of linear distortions in the formed sheet glass. Furthermore, the action of the attraction force in the direction reverse to the direction of the stretching force causes a portion of the molten glass to stagnate along the surfaces of the projection 66e of the sluice wall 66 as an additional cause of the linear distortions in the formed sheet glass.

Referring again to FIG. 4, the slant surface 36b of the sluice wall 36 according to the invention allows the molten glass in the pool 40 to smoothly enter the gap between the lower end of this wall 36 and the molten metal 25. Accordingly even an upper portion of the molten glass in the pool 40 advances smoothly as represented by arrow 77 and scarcely tends to stagnate along the surface of the sluice wall 36. As an additional advantage of the slant surface 36b, the flow of the molten glass increases its velocity as it approaches the downstream end of the gap between the sluice wall 36 and the molten metal 25, so that there arises a considerable viscosity resistance of the molten glass to serve as a reaction force to the stretching force acting on the glass ribbon 60 with the effect of dissolving the concentration of reaction force at the edge where the vertical surface 36c of the wall 36 and the upper surface of the molten glass intersect. Furthermore, in this case it is unnecessary to greatly stretch the glass ribbon 60 in a region immediately downstream from the sluice wall 36 because the thickness of the glass at the downstream end of the gap between the wall 36 and the molten metal 25 is already very small.

The contact of the molten glass with the sluice wall 36 terminates at the lower edge of the rear vertical surface 36c of the wall 36. Therefore, the attraction force A attributed to the affinity of the molten glass to the wall 36 acts on the glass ribbon 60 only in the direction perpendicular to the principal direction F of the stretching force. This means that nonuniform distribution of the attraction force A over the width of the glass ribbon 60 has no influence on the uniformity of the stretching force F. Besides, there is no possibility of stagnation of the molten glass along the rear surface 36c of the sluice wall 36 by the action of the attraction force A. For these reasons, a thin sheet glass formed by the method of the invention by using the sluice wall 36 of the above described shape is free from linear distortions.

As to the material of the sluice wall 36, it is preferred to use a heat-resistant material which is not easily wetted with molten glass, such as graphite or boron nitride, with a view to preventing stagnation of molten glass along any surface of this wall 36.

As to the presence of a number of small bubbles in a thin sheet glass produced by the above described prior art method, we have confirmed that the fundamental cause of this phenomenon is the electric resistance heating of the molten glass in the sluice region. Although the mechanism of the bubbling has not yet fully been clarified, there are two highly probable reasons.

Firstly, the flow of a high intensity current in the sluice-forming block, which is utilized also as an electrode, will cause gradual diffusion of the material of this block into the molten glass by the effect of electromigration in the block, and the diffused material will react with the molten glass to generate a gaseous decomposition product as the source of small bubbles in the molten glass. For example, when carbon is used as the material of the sluice-forming block through which a current of 200 A, 25 V is continuously supplied to the molten glass, the surfaces of the carbon block become rough and undulated only in several hours. In fact bubbling occurs in the molten glass while the carbon block undergoes such erosion. Besides, such roughening of the carbon block surfaces results in the appearance of linear and significant distortions in the obtained sheet glass. To completely prevent such erosion of the sluice-forming block, it is necessary to use a high frequency power supply that can completely cut off the direct current component, but this is quite unfavorable from an economical viewpoint.

Secondary, it is inevitable that the current density in the molten glass under electric resistance heating becomes nonuniform and consequentially the molten glass is heated nonuniformly. When molten glass is supplied onto the molten metal bath through a canal extending from the glass melting furnace, it is inevitable that the molten glass is somewhat cooled in its side marginal regions flowing along the side walls of the canal since the outer surfaces of the side walls are exposed to the atmosphere. Therefore, always there is a temperature gradient in the molten glass pool upstream of the sluice-forming block when considered widthways of the molten metal bath. That is, the temperature of the molten glass is highest in the central region and gradually lowers towards the both sides. When an electric current is caused to flow in the molten glass having such a temperature gradient, the current density becomes highest in the central region where the glass temperature is highest because the electric resistance of molten glass lowers as the temperature rises. Therefore, the temperature difference between the central region and side regions of the molten glass become still greater. As a result, the molten glass in the central region is heated up to an unnecessarily high temperature and assumes a reboiled state with generation of small bubbles. On the other hand, the molten glass in the side marginal regions is hardly heated up to a predetermined temperature, particularly when the molten glass temperature is so controlled as to realize the predetermined temperature in the central region of molten glass pool. Since it is difficult to obtain sheet glass of acceptable quality from molten glass of unduly low temperature, the existence of a significant temperature gradient in the molten glass pool is unfavorable also from the viewpoint of productivity.

In the method of the invention, it is not intended to heat the molten glass 40 in the vicinity of the sluice wall 36, and therefore the sluice wall 36 is provided with no heating means. However, the upstream space 42 above the molten glass pool 40 is maintained at a sufficiently high temperature by operating the heating elements 46. The heat-insulating wall 30 and the sluice wall 36 serve as a substantial partition between the upstream space 42 and the downstream space 44 in which the cooler 48 is provided, so that it becomes easy to maintain a desirably and almost uniformly high temperature atmosphere in the upstream space 42. It is desirable that the heater elements 46 are sufficiently distant from the sluice wall 36 so as not to positively heat this wall 36. Also it is desirable that the vertical distances of the heater elements 46 from the molten glass pool 40 are sufficiently great because otherwise the molten glass will possibly exhibit a significant temperature gradient widthways of the pool 40 and will pass through the gap between the sluice wall 36 and the molten metal 25 without cancellation of the temperature gradient.

In the downstream space 44 a relatively low temperature atmosphere is maintained by operating the cooler 48. It is recommended to design and arrange the cooler 48 such that a sufficiently cool gas atmosphere arrives at the sluice wall 36 to efficiently cool the rear vertical surface 36c of this wall 36. That is, the cooler 48 is preferably located close to the sluice wall 36 although it is not necessary to arrange the cooler 48 on the same level as the lower end of the sluice wall 36 because the cool gas atmosphere moves downwards. The cooling of the vertical surface 36c of the sluice wall 36 has the effect of suppressing or minimizing wetting of the wall surface 36c with the molten glass flowing through the gap between the wall 36 and the molten metal 25 and, hence, preventing the molten glass from forming a gob along the surface of the sluice wall 36. In short, the cooling is effective for obtaining a thin sheet glass free from distortion.

The primary purpose of the introduction of a mixed gas of nitrogen and hydrogen into the downstream space 44 through the gas ducts 54 is to prevent oxidation of the molten metal 25. Besides, this mixed gas makes some contribution to the maintenance of a low temperature atmosphere in the downstream space 44. Furthermore, a portion of the mixed gas flows towards the upstream space 42 and cools the rear vertical surface 36c of the sluice wall 36 before the gas enters the upstream space 42 through the gaps 52 between the sluice wall 36 and the side refractory walls 20 with an additional effect of cooling the relatively thick side marginal regions 61 of the glass ribbon 60. By rapidly cooling the side marginal regions 61, the tendency of the stretched and thickness-reduced glass ribbon 60 to resume an equilibrium thickness (a phenomenon commonly called refloating) can effectively be suppressed.

Figure 7:
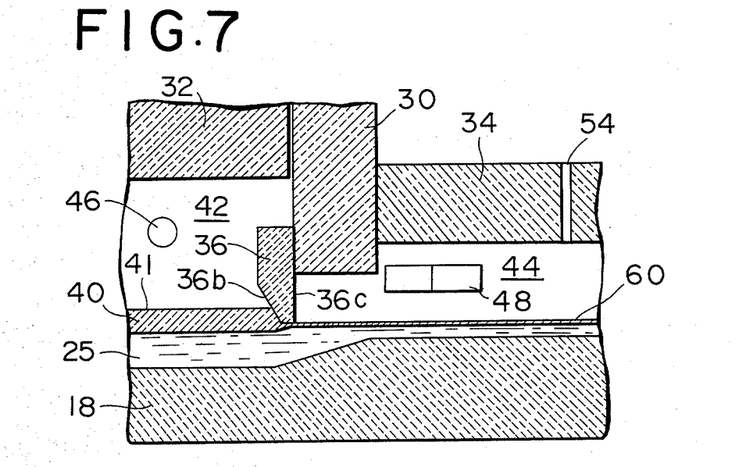
FIG. 7 shows a minor modification of a sluice region in the apparatus of FIG. 1 in a similar sectional view.

The provision of the auxiliary heat-insulating wall 31 is not an indispensable requisite. A shown in FIG. 7, it is optional to attach the sluice wall 36 directly to the heat-insulating wall 30 by omitting the auxiliary heat-insulating wall. Anyhow, it is undesirable to cover an unnecessarily large area of the rear vertical surface 36c of the sluice wall 36 by the heat-insulating wall 30 or the auxiliary heat-insulating wall 31 from the viewpoint of efficiently cooling this surface 36c.

EXAMPLE

Molten glass 15 prepared in a conventional glass melting and refining furnace was continuously delivered onto the molten metal (tin) bath 16 in the glass forming chamber 10 through the canal 12. The control tweel 28 was kept opened to such extent that the feed rate of the molten glass 15 was constantly 1000 kg/hr. In the pool 40, the temperature of the molten glass was 1150° C., and the viscosity was about $2 \times 10^4$ poises. The temperature of the molten glass in the pool 40 was controlled by adequate operation of the heating elements 46 located above the pool 40, and the temperature of molten glass 15 flowing the canal 12 was also controlled. By operating the liftout rolls 62, a tractive force was applied to a molten glass layer formed by the gradual advance of the molten glass in the pool 40 through the narrow gap between the lower end face 36d of the sluice wall 36 and the surface of the molten metal 25, and the molten glass layer was stretched in the longitudinal direction of the molten metal bath 16 during its travel from the sluice wall 36 to the exit lip 58 to turn into thin glass ribbon 60. The cooler 48 was operated so as to cool the glass ribbon 60 and the rear vertical surface 36c of the sluice wall 36, and a mixed gas of nitrogen and hydrogen was continuously introduced into the downstream space 44.

The revolution of the liftout rolls 62 was controlled such that the glass ribbon 60 advanced at a speed of 4.2 m/min. The glass ribbon 60 continuously formed under these operation conditions had a thickness of 0.4 mm, and there were no perceptible defects such as linear distortions or bubbles in this glass ribbon.

Figure 12:
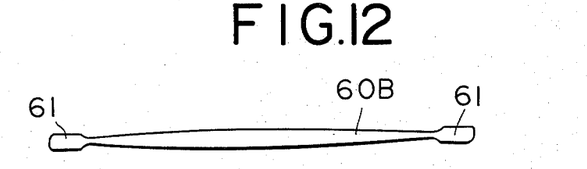
FIG. 12 is a schematic front elevational view of a glass ribbon which is unsatisfactory in the uniformity of its thickness.

In the foregoing description, the lower end face 36d of the sluice wall 36 was taken as to be flat and parallel to the surface of the molten metal 25. However, it is preferred to make this end face 36d tapered or curved such that the vertical distance of this end face 36d from the surface of the molten metal 25 becomes minimal in a central region of the molten metal bath 16 when considered widthways of the bath 16 and maximal in both side regions. The reason is that the thin glass ribbon 60 formed by the method of the invention tends to become nonuniform in its thickness, though in a very strict sense, when the lower end face 36d of the sluice wall 36 is entirely flat. More particularly, the thickness of the glass ribbon in its widthways central region tends to become greater than the thickness in its side regions contiguous to the aforementioned side marginal regions 61. FIG. 12 shows, with exaggeration, a glass ribbon 60B exhibiting such a gradient of thickness.

The fundamental cause of the above described nonuniformity of the glass ribbon thickness is that the temperature of the molten glass in side regions of the pool 40 becomes slightly lower than the glass temperature in the central region of the pool 40. Therefore, when the molten glass flows out of the pool 40 through the gap between the lower end face 36d of the sluice wall 36 and the molten metal 25 the flow rate of the molten glass becomes higher in the laterally central region of the gap than in side regions, so that the glass layer formed downstream of the sluice wall 36 tends to have a maximal thickness in its central region. Furthermore, the action of a longitudinally stretching force on the unsolidified glass layer causes the side regions of the glass layer to be laterally drawn towards the central region.

In view of such reason for the nonuniformity of the thickness of the glass ribbon, we thought out that it will be possible to solve this problem by shaping the lower end face of the sluice wall 36 such that actual flow rate of molten glass through the gap between this end face and the molten metal 25 in the bath 16 becomes uniform over the entire length of the gap or sluice wall 36 extending widthways of the bath 16, and by experiments this thought has been confirmed to be quite correct.

Figure 8:
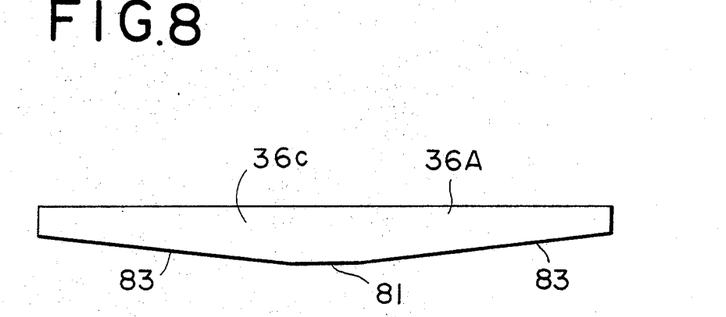
FIGS. 8 and 9 are fragmentary rear elevation views of two differently designed sluice-forming blocks for use in the apparatus of FIG. 1, respectively.

FIG. 8 shows a lower end portion of a sluice wall 36A, viewed from the rear side in the longitudinal direction of the molten metal bath 16 in FIG. 1, as a relatively simple embodiment of this thought. The lower end face of this sluice wall 36A is divided into a horizontally flat surface 81 that occupies only a relatively narrow central region and two slant surfaces 83 respectively extending from the side edges of the horizontal surface 81 to the end edges of the sluice wall 36A. Each slant surface 83 slants such that the vertical distance between the slant surface 83 and the horizontal plane containing the central surface 81 increases as the horizontal distance of the same surface 83 from the center of the wall 36A increases. As will readily be understood, it is important to make the two slant surfaces 83 symmetrical with respect to a vertical plane containing the central lateral axis of the sluice wall 36A. The use of this sluice wall 36A brings about a considerable improvement in the uniformity of the thickness of the formed glass ribbon.

Figure 9:
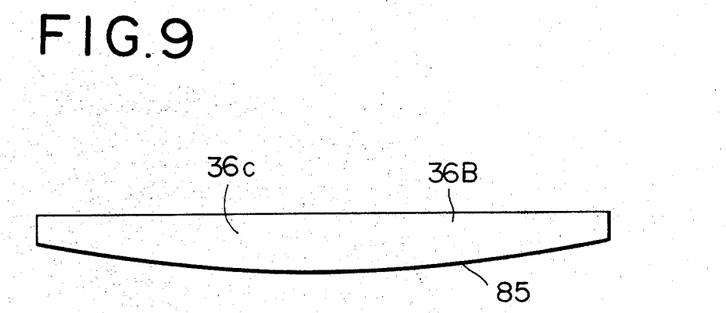
Figure 11:
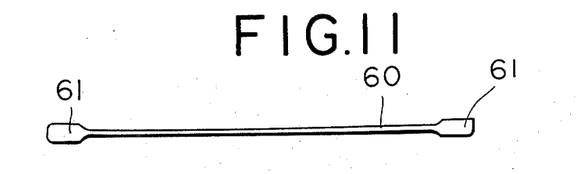
FIG. 11 is a schematic front elevational view of a glass ribbon formed by a method of the invention.

FIG. 9 shows another sluice wall 36B as a more preferable embodiment. This sluice wall 36B has a convexly and gently curved surface 85 as its lower end face over the entire length of the wall. This end face 85 is curved such that the vertical distance of this surface 85 from the surface of the molten metal bath 16 becomes minimal at the lengthwise center of the sluice wall 36B and gradually increases as the horizontal distance from the center of the wall 36B increases. The curvature of this surface (curvature of the curve at the lower edge of the vertical rear surface 36c of the wall 36B) may be differentiated between a central region and the remaining regions, but it is usual and convenient to employ a uniform curvature over the entire length of the wall 36B. Anyhow, the curved end face 85 should be made symmetrical with respect to a vertical plane containing the central lateral axis of the sluice wall 36B. By using this sluice wall 36B in the method of the invention, it is possible to obtain glass ribbon 60 with very high uniformity of thickness as schematically illustrated in FIG. 11 even when the thickness of the glass ribbon 60 is considerably smaller than 1 mm.

Most preferably, the shape or curvature of the curved lower end face 85 of the sluice wall 36B is determined in the following way.

Figure 10:
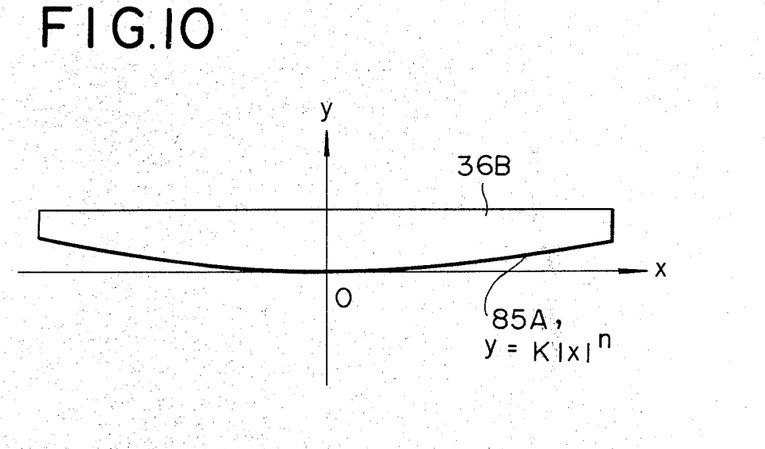
FIG. 10 is a graphical diagram for explanation of a preferred shape of the bottom end face of the sluice-forming block of FIG. 9.

In FIG. 10, curve 85A represents a lower edge of the sluice wall 36B in its vertical and longitudinal section, so that the shape of the curved lower end face 85 can be determined by geometrically or algebraically defining this curve 85A. A horizontal and straight line that extends parallel to the longitudinal axis of the sluice wall 36B (transversely of the molten metal bath 16) and is tangent to the aforementioned lower edge of the wall 36B at its center O is taken as the x-axis in FIG. 10, and a vertical and straight line intersecting the x-axis at the center O is taken as the y-axis. Then, it is preferred that the curve 85A represents the equation $y = k|x|^n$, on condition that $3 \times 10^{-11} \leq k \leq 3 \times 10^{-4}$; $1.5 \leq n \leq 4$; and $0.3 \leq k \cdot 10^{2.5n} \leq 1.5$. We have experimentally confirmed that by using the sluice wall 36B having such a curvature of the lower end face 85 it is possible to obtain a thin sheet glass which is extremely high in the uniformity of the thickness over the entire width of the sheet glass, and that such a curvature of the lower end face 85 is particularly suitable when the viscosity of the molten glass in the pool 40 is in the range from $10^3$ to $10^5$ poises and the width of the sheet glass is in the range from about 15 cm to about 100 cm.

Figure 14:
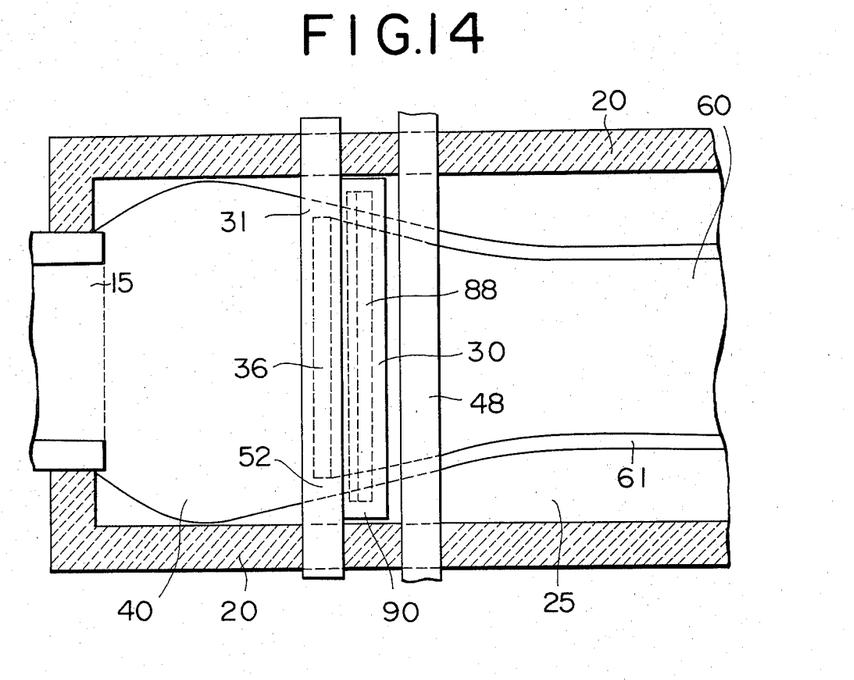
FIG. 14 is a fragmentary plan view of the apparatus of FIG. 13.
Figure 15:
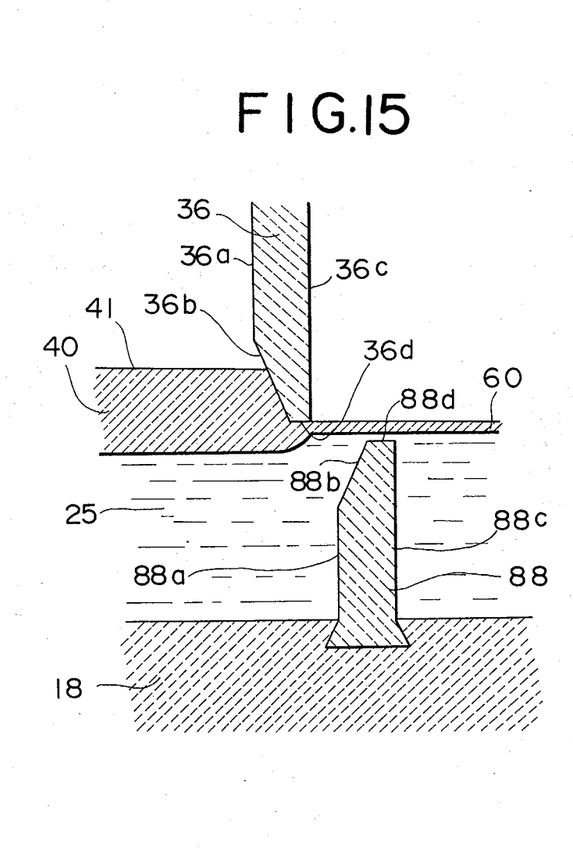
FIG. 15 is an enlargement of a sluice region in FIG. 14.

Referring to FIGS. 13–15, it is preferable to build a weir wall 88 in the molten metal bath 16 at a section immediately downstream from the sluice wall 36, especially when it is intended to produce very thin sheet glass having a thickness of about 0.2 mm or smaller.

A primary purpose of this weir wall 88 is to minimize the transfer of the molten metal 25 from the upstream region right beneath the molten glass pool 40 to the other region downstream of the sluice wall 36. When glass ribbon 60 having a desired thickness is formed by applying a stretching force to a molten glass layer resulting from the flow of molten glass through the gap between the sluice wall 36 and the molten metal 25, it is important, as mentioned hereinbefore, to rapidly cool the glass ribbon to a temperature at which the glass does not make a viscous flow to thereby prevent the glass ribbon from resuming equilibrium thickness. Therefore, it is unfavorable that the molten metal 25 on which the glass ribbon floats has an unnecessarily high temperature. However, the molten metal right beneath the molten glass pool 40 increases its temperature by the conduction of heat from the molten glass, and a considerable portion of the excessively heated molten metal flows into the downstream region where the glass ribbon is formed (disregarding the weir wall 88). This phenomenon is unfavorable for the efficiency of cooling of the glass ribbon and sometimes causes the thickness of the glass ribbon to become nonuniform. Furthermore, the glass ribbon tends to warp because of an increased temperature difference between its upper surface exposed to a cool atmosphere and its lower surface contacting the high temperature molten metal. Actually, such unfavorable influences of the transfer of the heated molten metal from the upstream region to the downstream region are imperceptible in cases of producing sheet glass thicker than about 0.4 mm but become significant when the glass ribbon is made thinner. Apart from the flow of the molten metal attributed to the heat of molten glass in the pool 40, it is inevitable that a flow of an upper surface portion of the molten metal accompanies the flow of the molten glass through the sluice formed by the sluice wall 36. However, in a region immediately downstream from the sluice wall where the molten glass layer is reducing its thickness, the molten glass and the upper surface portion of the molten metal flow in different directions and at different velocities, so that stress is produced at the interface between the molten glass and the molten metal, i.e. between two fluids considerably different in viscosity. In the case of forming a glass ribbon thinner than about 0.3 mm, the stress produced in this way is presumed to be the cause of slight degradation of the optical characteristics of the glass ribbon and the appearance of minute linear distortions on the lower surface of the glass ribbon.

Another purpose of the weir wall 88 is to minimize the differences of the direction of flow and the flow velocity of the upper surface portion of the molten metal in the aforementioned region immediately downstream of the sluice wall 36 and the molten glass lying thereon.

The weir wall 88 is a vertical wall with its base portion embedded in the bottom refractory 18 of the molten metal bath 16. This wall 88 extends transversely of the molten metal bath 16 parallel to the sluice wall 36 but terminates at some distances from the two side walls 20 of the bath 16, as can be seen in FIG. 14, to leave a gap 90 between each end of this wall 88 and the side wall 20. The upper end face 88d of the weir wall 88 lies slightly below the level of the lower end face 36d of the sluice wall 36 so as not to make contact with the molten glass 40 or the glass ribbon 60 floating on the molten metal 25. On the front side facing the upstream region of the molten metal bath 16, the weir wall 88 has a vertical surface 88a in its lower portion and a slant surface 88b in an upper end portion. The vertical surface 88a is located slightly downstream from the rear vertical surface 36c of the sluice wall 36, and the slant surface 88b slants such that the vertical distance of this surface 88b from the surface of the molten metal 25 decreases as the horizontal distance of this surface 88b from the inlet end of the molten metal bath 16 increases. On the rear side, the weir wall 88 has a vertical surface 88c extending from the rear edge of the upper end face 88d. Preferably the inclination of the slant surface 88b is such that this surface 88b and the slant surface 36b of the sluice wall 36 become nearly symmetrical with respect to a horizontal plane.

As to the material of the weir wall 88, it is preferred to use a heat-resistant material which does not react with the molten metal 25, such as graphite or boron nitride. It is recommended to smoothly finish the surfaces of the weir wall 88 at least in its upper portion.

Figure 16:
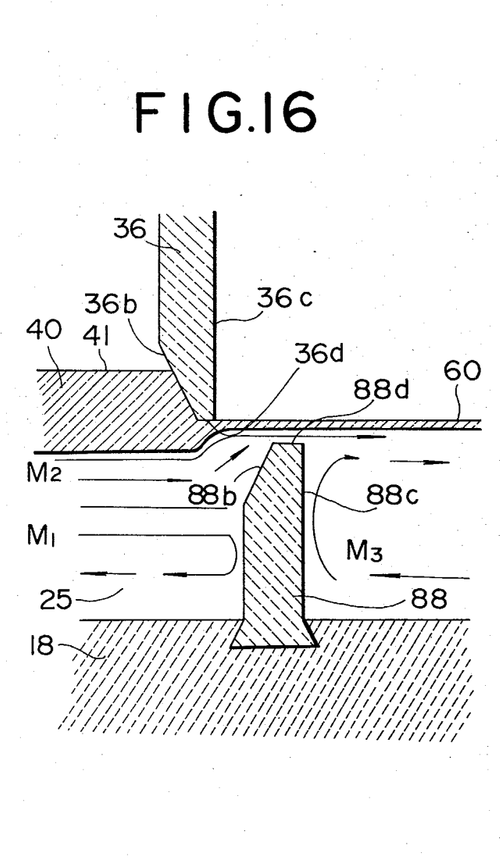
FIG. 16 explanatorily illustrates local movements of molten metal in the sluice region of FIG. 15.

The effects of the weir wall 88 will be explained with reference to FIG. 16, wherein it is assumed that the molten glass is flowing out of the pool 40 through the narrow gap between the lower end face 36d of the sluice wall 36 and the surface of the molten metal 25.

The molten metal 25 in the upstream region right beneath the molten glass pool 40 is heated by the transfer of heat from the molten glass pool 40, so that there is produced a flow (indicated by arrow $M_1$) of the molten metal towards the downstream as the effect of thermal convection. However, this flow $M_1$ is nearly completely blocked by the weir wall 88, so that the temperature of the molten metal downstream of this wall 88 is scarcely influenced by this flow $M_1$ of the heated molten metal.

As the molten glass flows beneath the lower end face 36d of the sluice wall 36 and then above the upper end face 88d of the weir wall 88, an upper surface portion of the molten metal 25 is caused to make a laminar flow (indicated by arrow $M_2$) from the upstream region towards the downstream region. This flow $M_2$ travels below the lower end face 36d of the sluice wall 36 and then above the upper end face 88d of the weir wall 88. Since the vertical distance between these two end faces 36d and 88d is very small, the molten metal flow $M_2$ is constricted while travelling above the slant surface 88b and the upper end face 88d of the weir wall 88. As a result, the flow velocity of the molten metal flow $M_2$ increases and becomes very close to the flow velocity of the molten glass lying immediately downstream of the sluice wall 36. The constriction and a resultant increase in the velocity of the molten metal flow $M_2$ have an additional effect of minimizing the deviation of the direction of this flow $M_2$ from the direction of flow of the molten glass layer right above. Therefore, the possibility of the development of the above described stress at the interface between the molten glass layer and the molten metal is greatly reduced, and the stress becomes weak even when developed.

As will have been understood from the foregoing explanation, the weir wall 88 is quite effective for producing a very thin sheet glass by the method of the invention without suffering from nonuniformity of the thickness, warping of the sheet glass or degradation of the optical characteristics.

Figure 17:
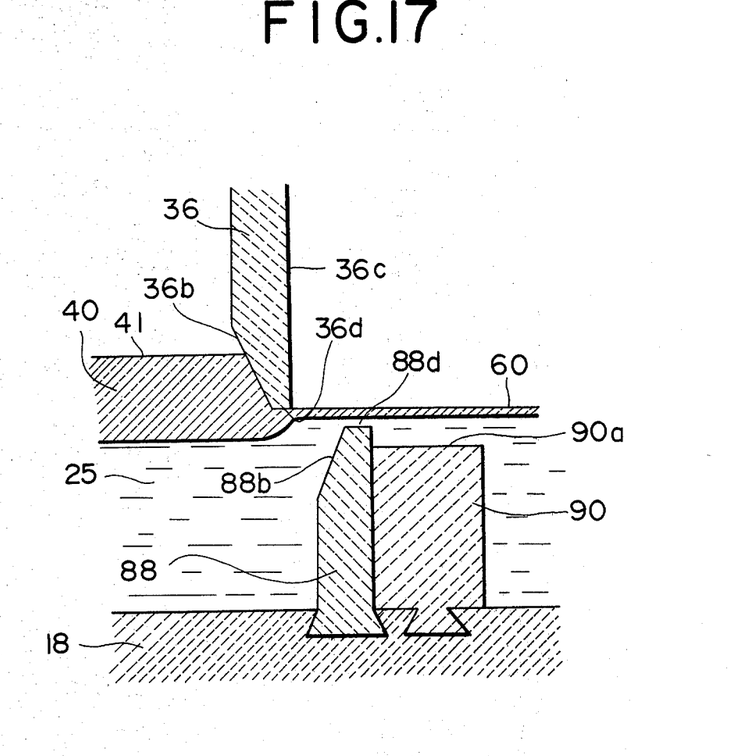
FIG. 17 shows a minor modification of the sluice region of FIG. 15 in a similar view.

Even when the weir wall 88 is employed a portion of the molten metal 25 transfers from the upstream region right beneath the molten glass pool 40 to the downstream region, as explained above. For this reason, weak convection of the molten metal occurs in the region downstream of the weir wall 88 as represented by arrow $M_3$ in FIG. 16. However, this convection $M_3$ exerts little influence on the molten glass just formed into a thin layer by the effect of the sluice wall 36 because the weir wall 88 stands downstream from the sluice wall 36. Referring to FIG. 17, if it is wished to further reduce the possibility of this convection $M_3$ of the molten metal exerting an influence on the molten glass layer or the glass ribbon 60, an auxiliary wall 90 may be built downstream of the weir wall 88 so as to be in contact with the rear surface 88c of the weir wall 88. The upper end face 90a of the auxiliary wall 90 should lie below the level of the upper end face 88d of the weir wall 88, and the length of this wall 90 in the direction transversely of the molten metal bath 16 will be equal to or close to the length of the weir wall 88.

What is claimed is:

1. In a method of forming a relatively thin sheet of glass in a glass forming chamber which includes a molten metal bath constituted of a bottom structure, two opposite side walls, a molten glass inlet structure at one end and a sheet glass outlet structure at the other end and a roof structure defining an interior space above said molten metal bath, the method having the steps of feeding molten glass onto the surface of the molten metal in said bath, causing the molten glass to spread on the surface of said molten metal bath to form a layer of the molten glass, stretching the molten glass layer in a direction substantially parallel to said side walls so as to reduce the thickness of said layer and advance said layer towards said outlet structure, and cooling the thinned molten glass layer;

the improvement comprising the steps of:

providing a sluice-forming wall in said interior space at a distance downstream from said inlet structure so as to extend widthways of said molten metal bath and leave a vertically narrow gap between a lower end of said sluice-forming wall and the surface of the molten metal in said bath thereby producing a pool of the molten glass on the molten metal in a region between said inlet structure and said sluice-forming wall, a front side of said sluice-forming wall facing said pool being formed with a slant surface contiguous to said lower end of said wall such that the surface of the molten glass in said pool intersects said slant surface and that the vertical distance of said slant surface from the surface of the molten metal decreases as the horizontal distance of said slant surface from said inlet structure increases, the rear side of said sluice-forming wall being formed with a vertical surface contiguous to said lower end of said wall; and forming said layer of the molten glass by causing the molten glass to flow out of said pool through said vertically narrow gap.

2. A method according to claim 1, wherein a heat-resistant material which is low in wettability with said molten glass is used as the material of said sluice-forming wall.

3. A method according to claim 2, wherein said heat-resistant material is selected from the group consisting of carbon and boron nitride.

4. A method according to claim 1, wherein said sluice-forming wall is made to terminate at distances from said two side walls so as to allow a small portion of the molten glass in said pool to flow out through the spaces between said sluice-forming wall and said two side walls.

5. A method according to claim 1, wherein said lower end of said sluice-forming wall is a flat and horizontal surface.

6. A method according to claim 1, wherein said lower end of said sluice-forming wall is shaped such that the vertical width of said narrow gap becomes minimal in a widthways middle region of said molten metal bath and becomes maximal in side end regions of said molten metal bath.

7. A method according to claim 6, wherein said lower end of said sluice-forming wall is a horizontal surface in a lengthways central region of said wall but is an inclined surface in each of the remaining regions of said wall.

8. A method according to claim 6, wherein said lower end of said sluice-forming wall is a curved surface such that the vertical width of said narrow gap becomes minimal at the lengthwise center of said wall and gradually increases towards the longitudinal ends of said wall.

9. A method according to claim 7 or 8, wherein said lower end of said sluice-forming wall is symmetrical with respect to a vertical plane containing the lateral and central axis of said wall.

10. A method according to claim 8, wherein the lower end of said sluice-forming wall in longitudinal and vertical section thereof becomes a curve represented by the following equation, taking a horizontal straight line which extends parallel to the longitudinal axis of said wall and is tangent to said curved surface as x-axis and a vertical straight line which intersects the x-axis at the point of contact of the x-axis with said curved surface as y-axis:

$$y = k|x|^n,$$

wherein $3 \times 10^{-11} \leq k \leq 3 \times 10^{-4}$, $1.5 \leq n \leq 4$, and $0.3 \leq k \cdot 10^{2.5n} \leq 1.5$.

11. A method according to claim 1, further comprising the steps of dividing said interior space of said chamber into an upstream space contiguous to said inlet structure and a downstream space by providing a heat-insulating wall at a section downstream of said sluice-forming wall so as to extend transversely of said molten metal bath and leave a space between a lower end of said heat-insulating wall and the molten glass floating on the molten metal, maintaining a relatively high temperature atmosphere in said upstream space by providing and operating heating means in said upstream space, and maintaining a relatively low temperature atmosphere in said downstream space by providing and operating cooling means in said downstream space.

12. A method according to claim 11, wherein said cooling means is arranged so as to efficiently cool said vertical surface of said sluice-forming wall.

13. A method according to claim 11, further comprising the step of continuously introducing a non-oxidizing gas into said downstream space such that a portion of the introduced non-oxidizing gas flows into said upstream space through the space between said lower end of said heat-insulating wall and the molten glass floating on the molten metal.

14. A method according to claim 13, wherein said non-oxidizing gas is a mixture of nitrogen gas and hydrogen gas.

15. A method according to claim 13, wherein said sluice-forming wall is made to terminate at distances from said two side walls so as to allow a small portion of the molten glass in said pool to flow out through the spaces between said sluice-forming wall and said side walls.

16. A method according to claim 1 or 11, further comprising the step of restricting a mass transfer of the molten metal in said bath from a hot region beneath said pool of the molten glass to the remaining region by thermal convection and facilitating only a surface portion of the molten metal in said hot region to make a laminar flow accompanying the flow of the molten glass through said narrow gap by providing a vertical weir wall in said molten metal bath at a section immediately downstream of said sluice-forming wall so as to extend transversely of said bath and entirely submerge in the molten metal such that the upper end of said weir wall is slightly below the surface of the molten metal.

17. A method according to claim 16, wherein a front side of said weir wall facing said hot region of said bath is formed with a slant surface contiguous to said upper end of said weir wall such that the vertical distance of said slant surface of said weir wall from the surface of the molten metal decreases as the horizontal distance of this slant surface from said sluice-forming wall increases.

18. A method according to claim 17, wherein the rear side of said weir wall is formed with a vertical surface, said upper end of said weir wall being a flat and horizontal surface which intersects said slant surface and said vertical surface of said weir wall.

* * * * *